United States Patent [19]

Hardesty

[11] Patent Number: 5,499,669
[45] Date of Patent: Mar. 19, 1996

[54] REINFORCED SEMI-PNEUMATIC TIRE

[75] Inventor: Terry D. Hardesty, Columbus, Wis.

[73] Assignee: Deere & Company, Moline, Ill.

[21] Appl. No.: 275,181

[22] Filed: Jul. 14, 1994

[51] Int. Cl.⁶ .................................................. B60C 3/02
[52] U.S. Cl. .................... 152/158; 152/165; 152/325; 152/327; 152/453
[58] Field of Search .................... 152/158, 322, 152/323, 327, 165, 325, 329, 520, 522, 453

[56] References Cited

U.S. PATENT DOCUMENTS

| | | | |
|---|---|---|---|
| 1,170,225 | 2/1916 | Dillmore | 152/327 |
| 1,461,766 | 7/1923 | Wiegand | 152/165 |
| 2,246,117 | 6/1941 | Wallace | 152/158 |
| 2,713,373 | 7/1955 | Daugherty | 152/384 |
| 3,208,500 | 9/1965 | Knipp | 152/327 |
| 3,538,971 | 11/1970 | Stewart | 152/352 |
| 3,791,432 | 2/1974 | Calullerovich | 152/339 |
| 4,467,852 | 8/1984 | Ippen et al. | 152/158 |

OTHER PUBLICATIONS

The Pulaski Rubber Company, brochure entitled "Pulaski Rubber Crown Lip", 1 page, published in the U.S.A.
The Pulaski Rubber Company, brochure entitled "Pulaski Rubber Builds Semi–Pneumatic Tires for Years of Tough Farm Service", 8 pages, date unknown, published in the U.S.A.

*Primary Examiner*—Geoffrey L. Knable

[57] ABSTRACT

A semi-pneumatic tire having a radially inner wall, first and second side walls, a radially outer wall coupled between the side walls, and a pair of rib members extending radially inwardly from outer wall for generally rigidifying said outer wall under operating loads. The side walls include a radially outer portion and a radially inner portion, the inner portion being thicker and more rigid than the outer portion such that the radially outer wall abuts against the inner portion of the side walls when the outer wall shifts radially inwardly under operating loads.

1 Claim, 1 Drawing Sheet

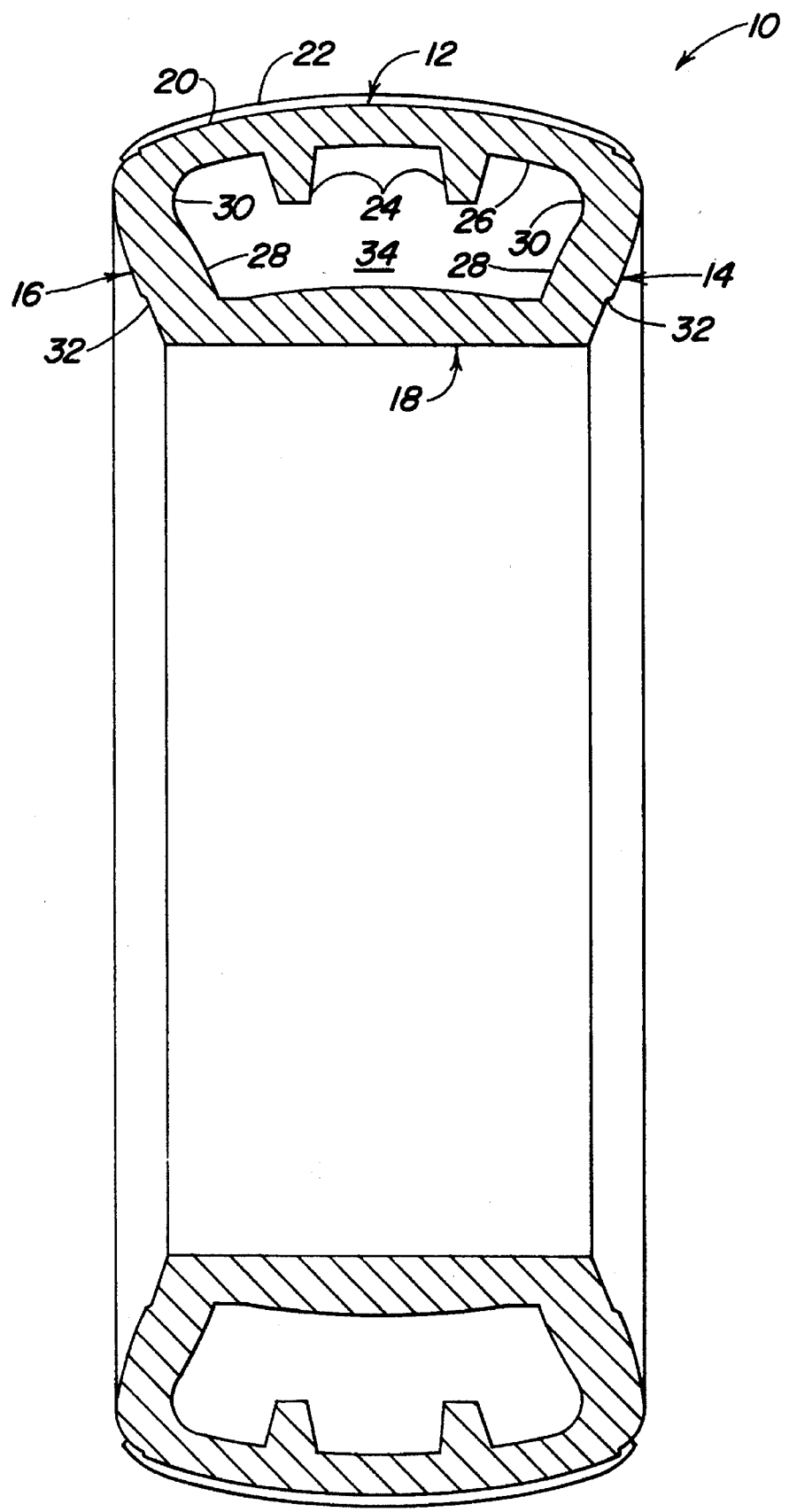

REINFORCED SEMI-PNEUMATIC TIRE

BACKGROUND OF THE INVENTION

This invention relates to semi-pneumatic tires.

It is known to provide small vehicles such as lawn tractors with relatively small non-driven ground engaging tires. Pressurized tires have been utilized as the tires of lawn vehicles since they easily absorb impact forces and other loads from the ground and therefore have the advantage of offering a good quality ride. However, when these pneumatic tires are used as the relatively small tires of lawn vehicles they can be prone to flats due in part to the small volume of air in the tires and the thin walls of the tire. These pneumatic tires can also be relatively costly to manufacture.

It is also known to provide small vehicles with non-driven tires which are semi-pneumatic since they are relatively inexpensive to manufacture. Semi-pneumatic tires are typically manufactured by extruding a linear section of tire, and then bending the length into the shape of a circle and bonding or otherwise coupling the ends together to form the tire. Before the material of the tire has completely set up or hardened, the tire is placed in a mold, and air is forced through a hole into the interior of the tire. The air forces the walls of the tire to expand outwardly and fill the cavity of the mold, thereby giving the tire its final shape. The hole remains in the tire, allowing air to enter and exit the interior of the tire as the tire flexes during operation over ground contours and operating loads. Semi-pneumatic tires do not have pressurized inner chambers, and therefore rely on the strength of the materials of the tire walls to support a vehicle. Flats, or the loss of air from the tire's interior, are generally not considered a problem with semi-pneumatic tires, since the tire is designed to flex or spring back to its original shape if it happens to become compressed or flattened under a heavy load. Typical semi-pneumatic tires provide generally uniform wall thicknesses. Semi-pneumatic tires with relatively thin walls tend to buckle easily under operating loads, which causes the tire rim to bottom out and cause poor ride quality. Semi-pneumatic tires having relatively thick walls tend to be relatively stiff and retain their shape until a relatively high load is encountered, at which time the walls of the tire tend to buckle abruptly as opposed to gradually. This stiffness and abrupt buckling of thick walled semi-pneumatic tires also tends to create relatively poor ride quality.

It is known to provide agricultural implements such as row crop planters with a wheel or tire which rolls across the ground directly above the newly planted seed to properly compact the soil. Many such tires are semi-pneumatic, and are designed to flex upon contact with the ground. As the tire rolls across the ground, the portion of the tire in contact with the ground flexes or buckles. As the tire continues to roll and rotate, the resiliency of the tire causes the flexed portion to return to its original shape once it is no longer in contact with the ground. As the tire flexes back to its original shape, any soil stuck to the tire will tend to fall off, and therefore the flexing action makes these tires self cleaning. When these tires are compressed due to ground contact, the radially outer wall presses against the radially inner wall. Upstanding nubs are often provided on the interior surface of the inner wall of the tire for helping insure that the interior walls of the tire do not stick together when compressed due to ground contact, and therefore the tire will flex back to its original shape to enhance self cleaning. Furthermore, many such nubs also insure that the compressed outer wall will not flex past center. Flexing past center might prevent the outer wall from flexing back to its original shape. The nubs help keep the outer wall in a flexed shape that will cause the outer wall to flex back to its original shape for self cleaning. These compaction tires are designed to buckle and flex relatively easily and abruptly, and are therefore not designed or well suited for use as tires of a small vehicle such as a riding lawn mower.

Therefore, it would be advantageous to provide a relatively small tire which does not exhibit the problems associated with flats, and which offers a good quality ride when used on vehicles such as small lawn tractors or mowers. It would be advantageous to provide a semi-pneumatic tire that flexes gradually and progressively, and which does not buckle or flex quickly or abruptly.

SUMMARY OF THE INVENTION

The preferred embodiment of the present invention provides a semi-pneumatic tire having an inner wall in abutment with a wheel rim, and a pair of side walls. An outer wall extends between the two side walls and includes a pair of rib members extending inwardly from the interior surface of the outer wall. The rib members generally act as T-shaped beams for strengthening and rigidifying the outer wall against flexing under loads imparted from the ground during operation. The rib members enable the outer wall to flex gradually and progressively as increasing loads are encountered, thereby enhancing the quality of the ride. The side walls include an inner portion, as well as an outer portion which is thinner than the inner portion. As the tire encounters forces from the ground, the side walls tend to shift outwardly away from each other to allow the tire to become compressed for absorbing some of the bumps encountered during operation. Since the relatively thin outer portions are composed of less material than the inner portions, the outer portions shift outwardly more readily than the thick inner portion. As the tire becomes more compressed the outer wall will eventually abut the thick inner portions of the side walls, and compression of the tire reaches a maximum. The rib members and the side members contribute to the tires ability to gradually and progressively flex and become compressed without allowing the tire to quickly or abruptly collapse, and therefore the tire according to the present invention displays good ride characteristics.

BRIEF DESCRIPTION OF THE DRAWINGS

The sole FIGURE is a sectional view of the semi-pneumatic tire according to the preferred embodiment of the present invention, with the wheel rim on which the tire rides not shown.

DESCRIPTION OF THE PREFERRED EMBODIMENT

Referring now to the FIGURE, there is shown the preferred embodiment of the present invention. A semi-pneumatic tire 10 is provided having a radially outer wall 12, first and second side walls 14 and 16, and a radially inner wall 18. The radially outer wall 12 includes a ground engaging exterior surface 20 having a small tread 22 formed thereon. A pair of upstanding ribs 24 extend inwardly from the interior surface 26 of the outer wall 12 and toward the inner wall 18. The ribs 24 extend continuously around the entire circumference of the tire 10, and act to reinforce the outer wall 12 against flexing as forces are transmitted from the ground to the tire 10. The side walls 14 and 16 include inner and outer portions 28 and 30. The inner portion 28 is relatively thick in comparison to the outer portion 30. Recesses 32 are formed in the side walls 28 and 30 for snugly receiving a metal or plastic wheel rim (not shown) in the center of the tire 10. The wheel rim can be assembled onto an axle of a small vehicle such as a riding lawn mower such that tire 10 serves as either a driven or non-driven ground engaging wheel. The axle serves as the axis of rotation about which the tire 10 rotates.

In this written description and claims, references to the location of the various portions of the tire 10 are described in relation to the axis of rotation of the tire 10. The terms "radially" and "axially" are intended merely to indicate that the part's location is being described with respect to the tire's axis of rotation, and are not descriptions of a parts shape. For example, the term "radially inner wall" is intended herein to refer to the fact that the inner wall 18 is positioned closer to the tire's axis of rotation than the radially outer wall 12.

Next, the operation of the preferred embodiment will be discussed. When the tire 10 contacts the ground, forces are transmitted from the ground to the tire 10 and are directed generally toward the tire's axis or center of rotation. The tire 10 includes an interior cavity 34 containing air at atmospheric pressure. A small passage (not shown) formed between the cavity 34 and the atmosphere allows air to pass therebetween. The tire 10 is not pressurized, and therefore the structure of the tire 10 must bear the entire load imparted to the tire 10 by the ground during operation.

The outer wall 12 does not offer much resistance to bending when ground forces are applied. However, the ribs 24 formed on the interior surface 26 of the outer wall 12 extend generally in the direction of the applied ground force or torque load. Therefore the ribs 24 act much like T-shaped beams for resisting the bending of the outer wall 12. The ribs 24 therefore act to resist bending of the outer wall 12, and thereby contribute to resisting compression of the tire 10. A gap or space is defined between the ribs 24 and the inner wall 18 which provides clearance for the ribs 24 and outer wall 12 to flex gradually when contacting the ground, thereby establishing a relatively soft ride quality.

As ground forces are encountered, the tire 10 also becomes slightly compressed. The side walls 14 and 16 resist the compression of the tire 10. The side walls 14 and 16 tend to shift outwardly away from each other slightly when the tire 10 is compressed. The tensile strength of the outer wall 12 acts to maintain the side walls 14 and 16 in position and generally hinders the side walls 14 and 16 from moving away from each other. The outer wall 12 thereby also resists compression of the tire 10 by acting to hold the side walls 14 and 16 together. Also, the portion of the wheel rim which is positioned in the recesses 32 will generally prevent or block the inner portion 28 of the side walls 14 and 16 from spreading further to the sides.

When the tire 10 encounters larger and larger loads it will become more and more compressed. As the tire 10 becomes compressed, the side walls 14 and 16 will compress slightly and begin to shift outwardly away from each other. The outer portions 30 of the side walls 14 and 16, which are thinner than the inner portions 28, will bend or flex more than the inner portions 28 of the side walls 14 and 16. As the tire 10 becomes more compressed the outer wall 12 will contact the thick inner portion 28 of the side walls 14 and 16, and maximum compression of the tire 10 is achieved. In this compressed mode the ribs 24 continue to act as T-shaped beams and serve to hinder further flexing of the outer wall 12 due to contact with the ground.

The preferred embodiment of the present invention provides for gradual or progressive compression and flexing of the tire 10. The ribs 24 which act as T-shaped beams act to reinforce the outer wall 12 and establish a gradual or progressive flexing of the outer wall 12. The ribs 24 generally prevent the outer wall 12 from quickly and abruptly collapsing inwardly, and yet the ribs 24 do allow the outer wall 12 to flex inwardly gradually under relatively light loads. Therefore the ride quality of the tire 10 is enhanced. Furthermore, a relatively small amount of material is required to form the ribs 24 as compared to prior art outer walls which have large thicknesses. Therefore material costs are minimized with the use of ribs 24 on the interior surface 26 of the outer wall 12. The ribs 24 are formed on the interior surface 26 or inside diameter of the outer wall 12 and do not contact the turf or ground surface during operation. Therefore the ribs 24 do not adversely dig or gouge the turf as the tire 10 rolls or executes a turn on well manicured areas.

I claim:

1. A semi-pneumatic tire, comprising:

a radially inner wall;

first and second side walls operatively coupled with the inner wall;

a radially outer wall operatively coupled with the first and second side walls, said outer wall being adapted to shift radially inwardly under operating loads caused by ground contact;

at least a pair of rib portions extending radially inwardly from the outer wall and toward the inner wall for generally rigidifying said outer wall under operating loads;

wherein said side walls include a radially outer portion and a radially inner portion, said inner portion being thicker and more rigid than the outer portion such that the radially outer wall abuts against the inner portion of the side walls when the outer wall shifts radially inwardly under operating loads, said shifting of the outer wall being thereby limited; and wherein said ribs reinforce the outer wall for generally hindering the inward shifting of the outer wall, said ribs being spaced from the side walls and radially inner wall for generally acting as T-beams when the radially outer wall abuts against the inner portion of the side walls for generally hindering further inward shifting when the outer wall abuts against the inner portion of the side walls.

* * * * *